Figure 1:
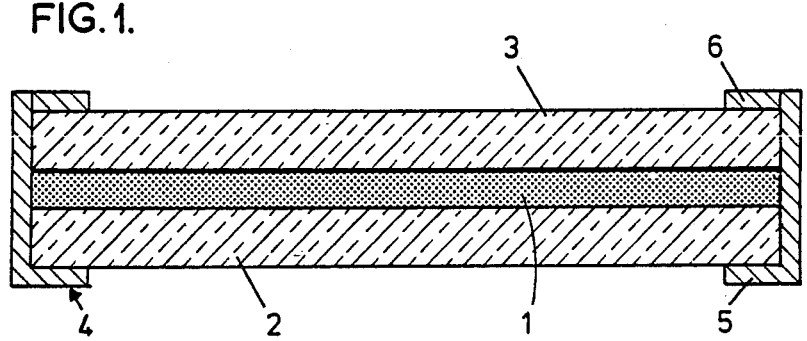

United States Patent [19]

De Boel et al.

[11] 4,190,698
[45] Feb. 26, 1980

[54] LIGHT-TRANSMITTING FIRE SCREENING PANEL

[75] Inventors: Marcel De Boel, Fontaine l'Eveque; Pol Baudin, Chatelineau, both of Belgium

[73] Assignee: BFG Glassgroup, Paris, France

[21] Appl. No.: 929,203

[22] Filed: Jul. 28, 1978

[30] Foreign Application Priority Data

Aug. 3, 1977 [GB] United Kingdom ............... 32579/77

[51] Int. Cl.² ............................................. B32B 17/06
[52] U.S. Cl. .................................... 428/334; 428/332; 428/335; 428/336; 428/411; 428/426; 428/427; 428/428; 428/432; 428/437; 428/438; 428/913; 428/920
[58] Field of Search ............... 428/428, 913, 920, 332, 428/334, 335, 336, 411, 426, 427, 432, 438, 437

[56] References Cited

U.S. PATENT DOCUMENTS

| | | | |
|---|---|---|---|
| 2,005,075 | 6/1935 | Dennison | 428/428 |
| 2,006,348 | 7/1935 | Fix | 428/428 |
| 2,009,441 | 7/1935 | Fix | 428/428 |
| 2,755,260 | 5/1956 | Stilbert | 428/920 |
| 2,912,394 | 11/1959 | Stilbert | 428/920 |
| 3,640,837 | 2/1972 | Gaeth | 428/428 |
| 3,955,987 | 5/1976 | Schaar | 428/920 |
| 3,974,316 | 8/1976 | Jacquemin | 428/913 |
| 3,997,700 | 12/1976 | Jacquemin | 428/432 |
| 4,058,643 | 11/1977 | Marshall | 428/913 |
| 4,071,649 | 1/1978 | Jacquemin | 428/432 |
| 4,104,427 | 8/1978 | Nolte | 428/913 |

*Primary Examiner*—Ellis P. Robinson
*Attorney, Agent, or Firm*—Cushman, Darby & Cushman

[57] ABSTRACT

A light-transmitting fire screening panel comprising at least one sheet of glass and at least one layer of intumescent material, the improvement which comprises utilizing in the layer a hydrated alkali metal silicate as intumescent material and one or more adjuvants selected from: urea, polyhydric alcohol (including glycerine, ethylene glycol and sorbitol), monosaccharide (including glucose), polysaccharide (including starch), sodium phosphate, sodium aluminate, aluminum phosphate, borax, boric acid and colloidal silica.

18 Claims, 3 Drawing Figures

LIGHT-TRANSMITTING FIRE SCREENING PANEL

The present invention relates to a light-transmitting fire screening panel comprising at least one sheet of glass and at least one layer of intumescent material.

It is an object of this invention to provide new formulations of such an intumescent layer which will afford various advantages which will be referred to later in this specification over prior art arrangement such as disclosed in U.S. Pat. No. 3,640,837.

According to the present invention, there is provided, as broadly defined, a light-transmitting fire screening panel comprising at least one sheet of glass and at least one layer of intumescent material, in which the layer containes a hydrated alkali metal silicate as intumescent material and one or more adjuvants selected from: urea, polyhydric alcohol (examples include glycerine, ethylene glycol and sorbitol), monosaccharide (for example glucose), polysaccharide (for example starch), sodium phosphate, sodium aluminate, aluminum phosphate, borax, boric acid and colloidal silica.

The term "polysaccharide" is used herein to denote a carbohydrate containing more than three molecules of monosaccharide, as $(C_6H_{10}O_5)_x$ and $(C_5H_8O_4)_x$ where x is greater than 3 in each case.

Such adjuvants have the general advantage of imparting improved fire resistance to the panel.

When fire breaks out on one side of a panel, a graph of the temperature of the other side against time will show an initial rise followed by a period when the temperature of that other side remains substantially constant (at about 100° C.) while intumescence of the layer proceeds. When intumescence is complete there is a second rise in temperature. It is clearly desirable to postpone the rise to a given temperature level for as long as possible, and it has been found that all the adjuvants cited have the effect of modifying such a graph in a favorable way.

The adjuvant may be effective to delay the rise in temperature of that face of the panel which is remote from a fire which breaks out near the panel in one or more of the following ways.

(A) by prolonging the second period during which the temperature remains substantially constant as intumescence proceeds;

(B) by reducing the gradient of the time/temperature curve after intumescence has been completed;

(C) by introducing a further period during which the layer undergoes modification at a constant temperature; and (D) by lowering the temperature at which intumescence is initiated.

The actual way in which the adjuvant will modify the properties of a layer on the outbreak of fire cannot always be stated precisely, but it is presently believed that adjuvants which act to prolong the constant temperature period during which intumescence takes place may be selected from: urea, glycerine and sorbitol.

In order to reduce the gradient of the time/temperature curve after intumescence has been completed, it is believed suitable to select the adjuvant from: monosaccharides which increase the viscosity of the tumid layer, and sodium phosphate, sodium aluminate, borax, boric acid, aluminum phosphate and colloidal silica which increase the refractiveness of the tumid layer.

In order to introduce a further period during which the layer undergoes modification at a constant temperature, it is believed suitable to select the adjuvant from: glycerine, ethylene glycol and a polysaccharide such as starch.

It will be noted that glycerine acts on the layer in two ways.

In order to reduce the temperature at which intumescence is initiated, it is believed that sodium phosphate may be used as adjuvant.

It will be appreciated that not all these adjuvants are of equal value, and that the advantages obtained will depend on the proportions in which the various adjuvants are used. In particular, the selection of an appropriate proportion is preferred so as to preserve the transparency of the panel and to avoid coloration of the layer.

In general, although the optimum proportion will vary according to the adjuvant used, it is preferred that the adjuvant should be present in a proportion of less than 20%, and usually less than 10%. In many cases adjuvants are used in proportions of less than 5%. These proportions and other percent proportions given in this specification are proportions by weight of the adjuvant compared with the total weight of the layer in a finished panel.

Glycerine is a particularly important adjuvant for use in an intumescent layer of a panel according to the invention. Excellent results are achieved when up to 10% glycerine is used, and for optimum results at least 4% is used.

It has been found that the addition of glycerine to the intumescent layer has the effect of prolonging the time during which the temperature of the face of the panel remote from a fire remains substantially constant at about 100° C., and furthermore that a second constant temperature period is exhibited where the then tumid layer undergoes further modification.

Glycerine used in these proportions has one further very important advantage. Intumescent layers are commonly formed by pouring a solution of the intumescent material into a mold or onto a supporting sheet and drying it. During production there is a risk that the intumescent layer will crack if it is dried too quickly, and this would, of course, impair the transparency of the finished panel; it has been found that the addition of glycerine inhibits such crack formation and thus it enables relatively thick intumescent layers to be formed without a prohibitively long drying time. Clearly the drying of relatively thin layers can also be speeded up. Ethylene glycol also imparts the advantage of more speedy drying.

Urea is another important adjuvant for use in the intumescent layer, and it is preferably used in a proportion of less than 5%, and optimally from 2 to 4%. The use of urea gives advantages in the foam structure of the tumid layer after the outbreak of fire, and it has the effect of prolonging the period during which the temperature of the panel face remote from a fire remains substantially constant.

Sorbitol is also an important adjuvant and its use gives advantages similar to those afforded by the use of urea. Sorbitol is preferably used in amounts from 2 to 4% of the layer. Satisfactory results have been achieved using up to 20%.

Of the inorganic adjuvants recited, preference is given to the use of the sodium salts.

Sodium phosphate, which is preferably used in proportions of up to 6% retards heat transmission to a face of the panel remote from a fire. Furthermore, the gradient of the time/temperature curve after intumescence is completed is reduced, that is, the refractiveness of the tumid layer is increased.

Sodium aluminate has a favorable effect in that it also increases the refractiveness of the layer.

Of the other adjuvants recited, particular mention is made of ethylene glycol, since experiments have indicated that the use of this material can retard heat transmission in an effective way.

The other materials recited for use as adjuvants also confer benefits on the outbreak of a fire since the transmission of heat to the face of the panel remote from the fire is retarded.

In certain particularly preferred embodiments of the invention, glycerine is used as an adjuvant in admixture with a saccharide, for example saccharose. Preferably when the adjuvant is used in admixture with another adjuvant or some further additive, the admixture is present in a proportion of less than 20%. Amounts below 10% or even below 5% can give very good results. When a saccharide, such as saccharose, is used as the further additive, it is preferably present in a proportion of 1 to 4%.

It has been found that the production of a panel of given efficiency which includes a layer comprising an alkali metal silicate as intumescent material can be facilitated by including certain adjuvants in the intumescent layer.

According to the invention in its second aspect therefore, there is provided a light-transmitting fire screening panel comprising at least one sheet of glass and at least one layer of intumescent material, in which the layer contains a hydrated alkali metal silicate as intumescent material in combination with one or more adjuvants selected to allow accelerated drying of the layer.

A layer of hydrated alkali metal silicate is formed from a solution, for example by pouring the solution over one of the sheets which will form the panel, or by pouring the solution onto a mold for subsequent transfer and assembly into the panel. It will be appreciated that the drying of the solution layer is critical in the case of a transparent panel, since a crust is apt to form on the layer, and the layer is apt to crack as it dries, and this will have a markedly deleterious effect on the transparency of the panel. In order to overcome this problem it has hitherto been common practice to insure that the drying takes place very slowly. The present invention in its second aspect enables such drying time to be reduced, and also enables relatively thick layers of intumescent material to be formed with satisfactory transparency and without prohibitively long drying periods.

In general, although the optimum proportion will vary according to the adjuvant used, it is preferred that the adjuvant should be present in a proportion of less than 20%, and usually less than 10%. In many cases adjuvants are used in proportions of less than 5%. These proportions and other percent proportions given in this specification are proportions by weight of the adjuvant compared with the total weight of the layer in a finished panel.

Preferably, the adjuvant is selected from: glycerine and ethylene glycol, and advantageously glycerine or ethylene glycol is used in admixture with a saccharide, for example, saccharose (sucrose).

The adjuvant is preferably used in a non-coloring proportion. Preferably each outer face of the panel is provided by a glass sheet so as to provide hard wearing scratch-resistant surfaces. Advantageously the various plies of the panel are bonded together to form a laminate.

The degree of fire resistance afforded by a panel incorporating at least one layer of intumescent material will obviously depend, inter alia, on the total thickness of the intumescent material used. However, increasing the thickness of the intumescent material will usually decrease the transparency of the panel and also, because the formation of relatively thick layers gives rise to difficulties in production, the cost of the panel will be increased. Accordingly it is preferred that the total thickness of intumescent material is at most 8 mm. Advantageously each layer is between 0.1 mm and 8 mm thick and optimally each layer is between 1 mm and 3 mm thick. The alkali metal silicate used as intumescent material is preferably hydrated sodium silicate.

Figure 2:
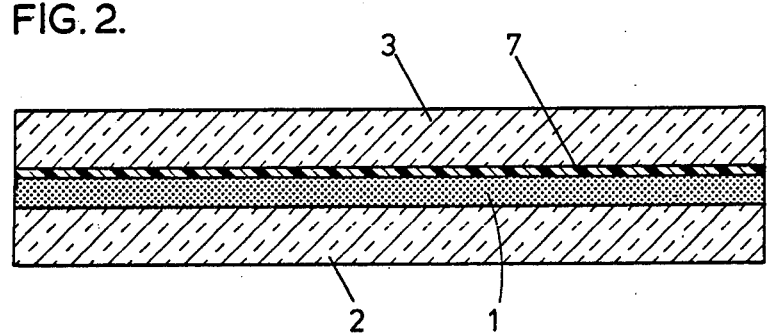
Figure 3:
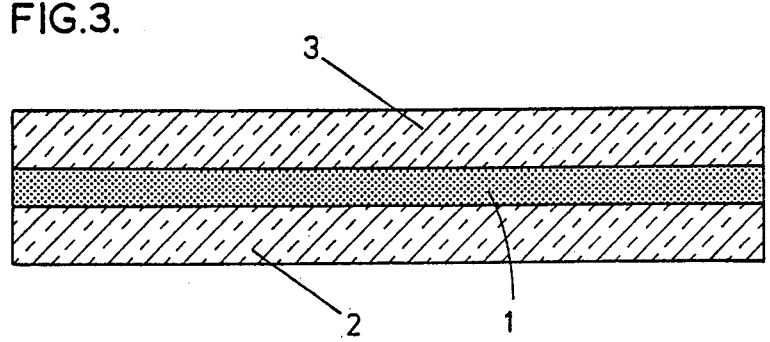

The present invention will now be further described by way of example and with reference to the accompanying diagrammatic drawings in which FIGS. 1 to 3 are diagrammatic cross-sectional views of three embodiments of fire screening panel.

In the drawings, a layer 1 containing hydrated alkali metal silicate is applied and bonded to a first glass sheet 2.

In FIG. 1, a second glass sheet 3 is applied to the exposed face of the intumescent layer 1 and is held in position by a clamping frame 4. The clamping frame 4 comprises an L-shaped section 5 and a separate or separable lip 6 so that on the outbreak of fire, the two glass sheets 2, 3 can move apart to accommodate changes in the volume of the layer as it becomes tumid.

In FIG. 2, a second glass sheet 3 is bonded to the exposed face of the intumescent layer using a layer of polyvinyl butyral 7.

In FIG. 3, a layer of intumescent material is bonded directly between two glass sheets 2, 3.

EXAMPLE I (FIG. 1)

In a specific practical example, a solution of hydrated sodium silicate in water which contained glycerine as adjuvant was applied to a glass sheet at a rate of 2.8 l/m² to form a solid layer. The weight ratio of $SiO_2$ to $Na_2O$ was 3.3 to 1 and the density of the solution was between 37° and 40° Baume'. The layer was dried by gentle heating. This took about 6 hours. The composition of the layer when set was:

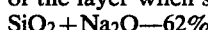
$SiO_2+Na_2O$—62%
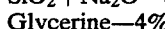
Glycerine—4%
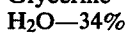
$H_2O$—34%

In fact, it is quite possible to dry a similar intumescent layer which does not contain glycerine in about the same time, but it is found that the surface of the layer containing glycerine is smoother and uncracked, thus contributing to the clearness of the panel prior to the outbreak of fire.

In a variant of this Example the 4% glycerine was replaced by a mixture with saccharose to give 3% glycerine and 1% saccharose in the finished panel. Similar results were achieved.

In a variant of this Example, the glycerine was not added to the solution, but rather the aqueous solution of sodium silicate was applied to the glass sheet and partially dried. A coating of glycerine was then applied to the exposed face of the layer.

The glycerine was, in fact, applied by dipping the layer into a batch of glycerine, but it will be appreciated that it could equally well have been applied in some other manner, for example, by spraying.

Similar results were achieved.

EXAMPLE II (FIG. 2)

A solution of hydrated sodium silicate containing glucose was applied to a glass sheet as described in Example I and dried. When set, the layer had the following composition:

$SiO_2 + Na_2O$—64%
Glucose—2%
$H_2O$—34%

This layer was then assembled to the second glass sheet via an intervening layer of polyvinyl butyral, and the assembly was subjected to heat and pressure to effect bonding, taking care that the heat applied was not sufficient to initiate intumescence.

In a variant of this Example, the intumescent layer was bonded directly to the second sheet. After this layer had set, it, and the second sheet, were wetted with more of the same solution and they were then assembled together and allowed to dry to complete bonding.

EXAMPLE III (FIG. 3)

Two sheets of glass each had an intumescent layer of hydrated sodium silicate containing glycerine applied to them as described in Example I, the layers each being 1.3 mm thick. The layers on the two sheets were then bonded together to form a panel (IIIA) 50 cm square. The sheets of glass were 3 mm thick.

Another panel (IIIB) in whose intumescent layers no adjuvant was present, but which was otherwise identical, was also made for comparison purposes.

The two panels were framed and tested in a wall of a furnace according to ISO R 834 and NBN 713.020. This test specifies that the temperature T (°C.) within the furnace should increase after t minutes according to $$\delta T = 345 \log_{10}(8t+1).$$

The maximum temperature of the outer faces of the panels was measured at various intervals after firing of the furnace, and the results are given in the following table (temperature in °C. to the nearest 5° C.).

| Time (minutes) | Panel IIIA | Panel IIIB |
|---|---|---|
| 30 | 120 | 160 |
| 40 | 240 | 270 |
| 42 | 250 | 280 |

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, This invention includes all modifications encompassed within the spirit and scope of the following claims.

What is claimed is:

1. A light-transmitting fire screening panel comprising at least one sheet of glass and at least one layer of intumescent material having a thickness between 0.1 and 8 mm, the improvement which comprises said layer containing a hydrated alkali metal silicate as intumescent material and one or more adjuvants selected from the group consisting of: urea, polyhydric alcohol, monosaccharide, polysaccharide, sodium phosphate, sodium aluminate, aluminum phosphate, borax, boric acid and colloidal silica, said adjuvant being present in a proportion of less than 20% by weight of the layer.

2. A panel as defined in claim 1 wherein said polyhydric alcohol includes glycerine, ethylene glycol and sorbitol, said monosaccharide includes glucose and said polysaccharide includes starch.

3. A panel as defined in claim 1 or 2 wherein said adjuvant is present in a proportion of less than 10% by weight of the layer.

4. A panel is defined in claim 1 or 2 wherein said adjuvant is present in proportion of between 2 and 20% by weight of the layer.

5. A panel as defined in claim 2 wherein glycerine is used as said adjuvant, said glycerine being present in a proportion of from 10% to 4% inclusive by weight of the layer.

6. A panel as defined in claim 1 or 2 wherein urea is used as said adjuvant, said urea being present in a proportion of less than 5% weight of the layer.

7. A panel as defined in claim 6 wherein the proportion of urea is between 2 and 4%.

8. A panel as defined in claim 1 or 2 wherein sorbitol is used as said adjuvant, said sorbitol being present in a proportion of between 2 and 4% by weight of the layer.

9. A panel as defined in claim 1 or 2 wherein sodium phosphate is used as said adjuvant, said sodium phosphate being present in a proportion of 6% or less by weight of the layer.

10. A panel as defined in claim 1 or 2 wherein said adjuvant is used in admixture with one or more other of said adjuvants or some other additive and such admixture is present in a proportion of less than 20% preferably less than 10%, by weight of the layer.

11. A panel as defined in claim 2 wherein glycerine is used as said adjuvant in admixture with a saccharide.

12. A panel as defined in claim 11 wherein said saccharide is present in a proportion of between 1 and 4% by weight of the layer.

13. A light-transmitting fire screening panel comprising at least one sheet of glass and at least one layer of intumescent material having a thickness between 0.1 and 8 mm, the improvement which comprises said layer containing a hydrated alkali metal silicate as intumescent material in combination with one or more adjuvants selected to allow accelerated drying of the layer selected from the group consisting of glycerine and ethylene glycol, said adjuvant being present in a proportion of less than 20% by weight of the layer.

14. A panel as defined in claim 13 wherein said adjuvant is used in admixture with a saccharide.

15. A panel as defined in claim 13 or 14 wherein said adjuvant is used in a non-coloring proportion.

16. A panel as defined in claim 13 or 14 wherein each outer face of the panel is formed by a glass sheet.

17. A panel as defined in claim 13 or 14 wherein various plies of the panel are bonded together to form a laminate.

18. A panel as defined in claim 13 or 14 wherein the alkali metal silicate used as intumescent material is hydrated sodium silicate.

* * * * *